United States Patent [19]
Pfeiffer et al.

[11] Patent Number: 5,688,170
[45] Date of Patent: Nov. 18, 1997

[54] ROTARY COMBINE HAVING A CONCENTRIC INFEED SECTION AND ECCENTRIC THRESHING AND SEPARATING SECTIONS

[75] Inventors: Dohn William Pfeiffer, Moline, Ill.; Klaus Adam Braunhardt, Zweibruecken, Germany; David Alden Skinner, Moline; Philip Alan Harden, Colona, both of Ill.

[73] Assignee: Deere & Company, Moline, Ill.

[21] Appl. No.: 520,277

[22] Filed: Aug. 28, 1995

Related U.S. Application Data

[63] Continuation-in-part of Ser. No. 397,319, Mar. 2, 1995, Pat. No. 5,445,563, which is a continuation of Ser. No. 86,774, Jul. 1, 1993, abandoned.

[51] Int. Cl.⁶ ............................................. A01F 12/10
[52] U.S. Cl. ........................... 460/69; 460/70; 460/80
[58] Field of Search ........................... 460/69, 80, 66, 460/79, 119, 63, 70; 56/14.6, 14.5

[56] References Cited

U.S. PATENT DOCUMENTS

| | | |
|---|---|---|
| 1,776,396 | 9/1930 | Schlayer . |
| 2,050,631 | 8/1936 | Schlayer . |
| 2,363,632 | 11/1944 | Weaver . |
| 4,124,032 | 11/1978 | Cowan, Jr. et al. ............ 56/14.6 |
| 4,348,855 | 9/1982 | DePauw et al. ............... 56/10.2 |
| 4,362,168 | 12/1982 | Hengen et al. . |
| 4,611,605 | 9/1986 | Hall et al. ..................... 460/80 |
| 4,875,891 | 10/1989 | Turner et al. ................. 460/110 |
| 5,078,646 | 1/1992 | Claas et al. ................... 460/69 |
| 5,112,279 | 5/1992 | Jensen et al. ................. 460/69 |
| 5,145,462 | 9/1992 | Tanis et al. ................... 460/68 |

FOREIGN PATENT DOCUMENTS

| | | |
|---|---|---|
| 0 631 716 | 1/1995 | European Pat. Off. . |
| 0085358 | 8/1983 | Germany . |
| 37 19858 C1 | 7/1988 | Germany . |
| 2019708 | 11/1979 | United Kingdom . |
| 2053644 | 2/1981 | United Kingdom . |
| 89 01735 | 3/1989 | WIPO . |

*Primary Examiner*—Terry Lee Melius

[57] ABSTRACT

An axial agricultural combine having a single element rotor defining a rotor axis. The rotor is housed in a rotor housing having an infeed section, a threshing section and a separating section. The infeed section of the rotor housing defines a infeed axis, the threshing section of the rotor housing defines a threshing axis and the separating section of the rotor housing defines a separating axis. The infeed axis is parallel to and in line with the rotor axis. The threshing axis is parallel to and offset from the rotor axis. The threshing axis is offset above and downstream from the rotor axis. The separating axis is parallel to and offset from the rotor axis. The separating axis is offset above and downstream from the rotor axis. The separating axis is more offset from the rotor axis than the threshing axis is offset from the rotor axis.

7 Claims, 5 Drawing Sheets

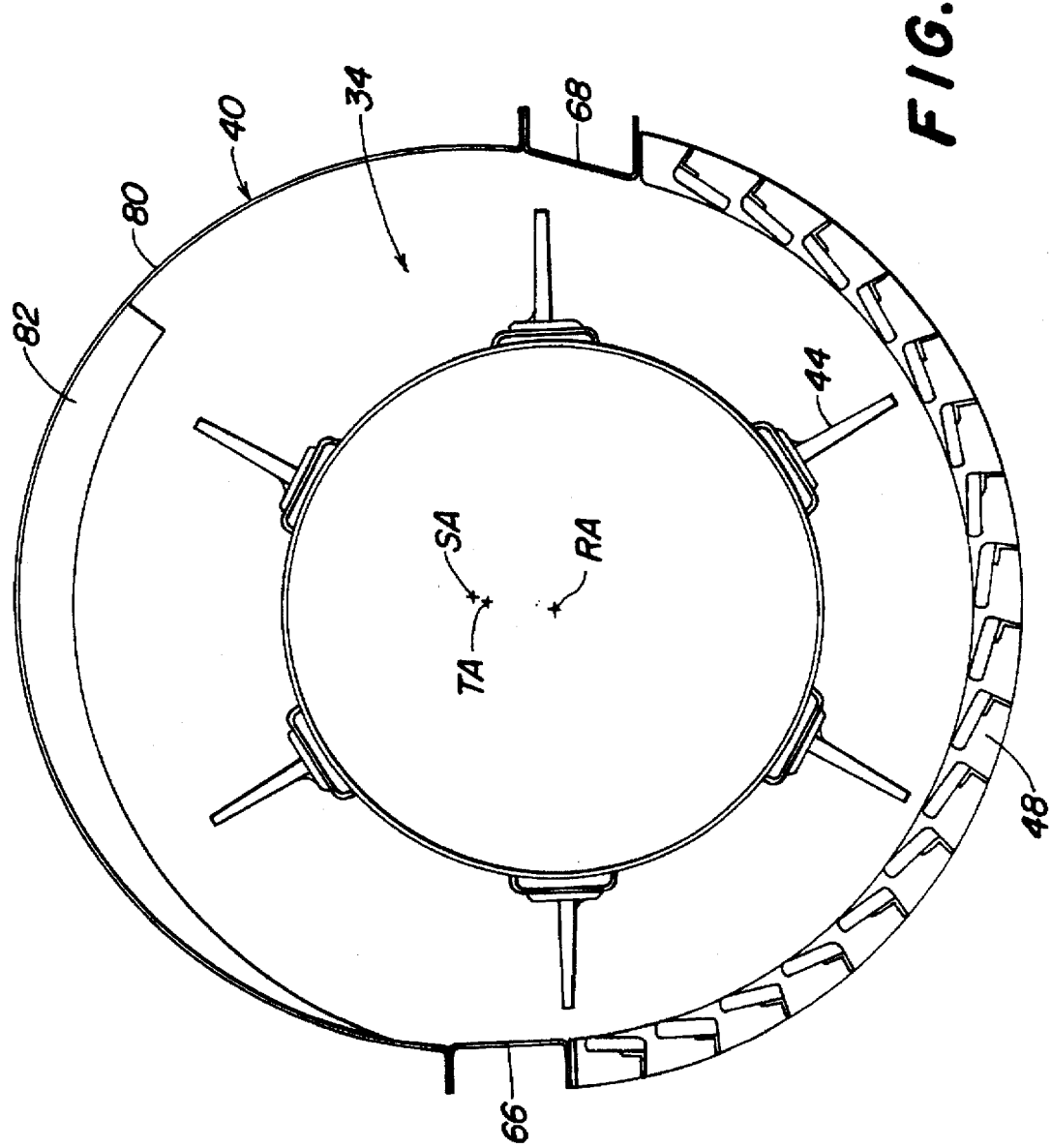

ROTARY COMBINE HAVING A CONCENTRIC INFEED SECTION AND ECCENTRIC THRESHING AND SEPARATING SECTIONS

This is a Continuation-In-Part of U.S. patent application Ser. No. 08/397,319, now U.S. Pat. No. 5,445,563 filed 2 Mar. 1995 which is a Continuation of U.S. patent Application Ser. No. 08/086,774 filed 1 Jul. 1993, now abandoned.

BACKGROUND OF THE INVENTION

1. Field of the Invention

The present invention is directed to a rotary agricultural combine having an axially aligned rotor housing having a concentric feeding section, an eccentric threshing section and a more eccentric separating section relative to a rotor housed therein.

2. Description of the Prior Art

Case IH of Racine, Wis., and New Holland, of New Holland, Pa., currently market rotary combines having axially aligned rotors. The Case IH combine is fitted with a single rotor located in a substantially cylindrical rotor housing. The rotor housing having threshing and separating sections. The New Holland combine uses two side-by-side rotors. Each rotor is housed in a substantially cylindrical rotor housing. Each rotor housing is provided with threshing and separating sections. As with the Case combine the rotor housing of the New Holland combines are concentrically arranged about the central longitudinal axis of the rotors.

The assignee of the present patent application has developed and marketed a hybrid combine having a conventional transverse threshing cylinder and an axial separating rotor. This hybrid system is illustrated in U.S. Pat. No. 5,112,279. The axial separator unit disclosed in this patent comprises a cylindrical rotor housing having a bottom portion provided with a grate and a top portion provided with helical vanes for indexing the crop material to the rear of the housing. A rotor having crop engaging assemblies engages the crop located in the bottom portion of the housing and throws it upwardly against the helical vanes. The central longitudinal axis of the rotor is located below the central longitudinal axis of the housing making the rotor eccentric with the housing.

SUMMARY

It is an object of the present invention to provide a rotary combine having an axially aligned rotor housing that is provided with an infeed section that is concentrically arranged about the infeed portion of the rotor; a threshing section that is eccentrically arranged about the threshing portion of the rotor; and a separating section that is more eccentrically arranged around the separating portion of the rotor.

It is a feature of the invention that the rotor is a single element arranged axially within the combine.

The rotor of the present invention is a single cylindrical tube having a number of radially extending crop engaging assemblies. The rotor has an infeed portion, a threshing portion and a separating portion. The rotor defines a rotor axis that is a central longitudinal axis extending through the rotor. The rotor is housed in a rotor housing having an infeed section, a threshing section and a separating section corresponding to the respective portions of the rotor.

The infeed section of the rotor housing is substantially cylindrical and defines a threshing axis. The infeed axis is a central longitudinal axis extending through the infeed section. The infeed section of the rotor housing is concentrically arranged about the infeed portion of the rotor.

The threshing section of the rotor housing has a slightly oblong cross section and defines a threshing axis. The threshing axis is a central longitudinal axis extending through the threshing section. The threshing section rotor housing is eccentrically arranged about the threshing portion of the rotor. The rotor housing being arranged so that the threshing axis is parallel to and lies directly above the rotor axis.

The separating section of the rotor housing has an extended oblong cross section when compared to the threshing section. The separating section defines a separating axis that is parallel to and above the threshing axis. The separating axis is a central longitudinal axis extending through the separating section. The separating section rotor housing is eccentrically arranged about the separating portion of the rotor. The rotor housing being arranged so that the separating axis is parallel to and lies above the rotor axis.

BRIEF DESCRIPTION OF THE DRAWINGS

FIG. 5 is a cross sectional transverse view of the separating section taken along line 5—5 of FIG. 2.

DETAILED DESCRIPTION

Figure 1:
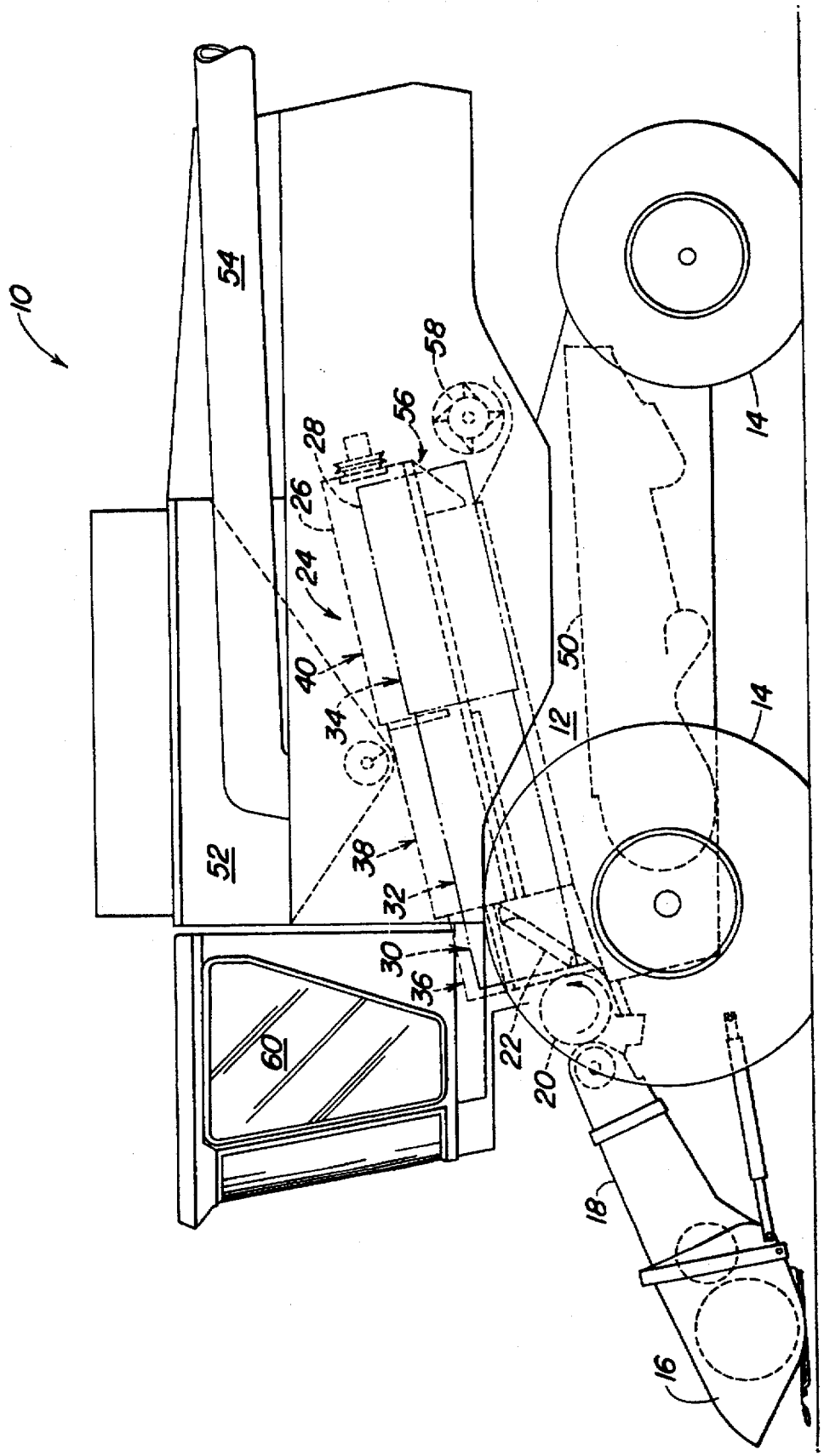
FIG. 1 is a side view of a rotary agricultural combine.
Figure 2:
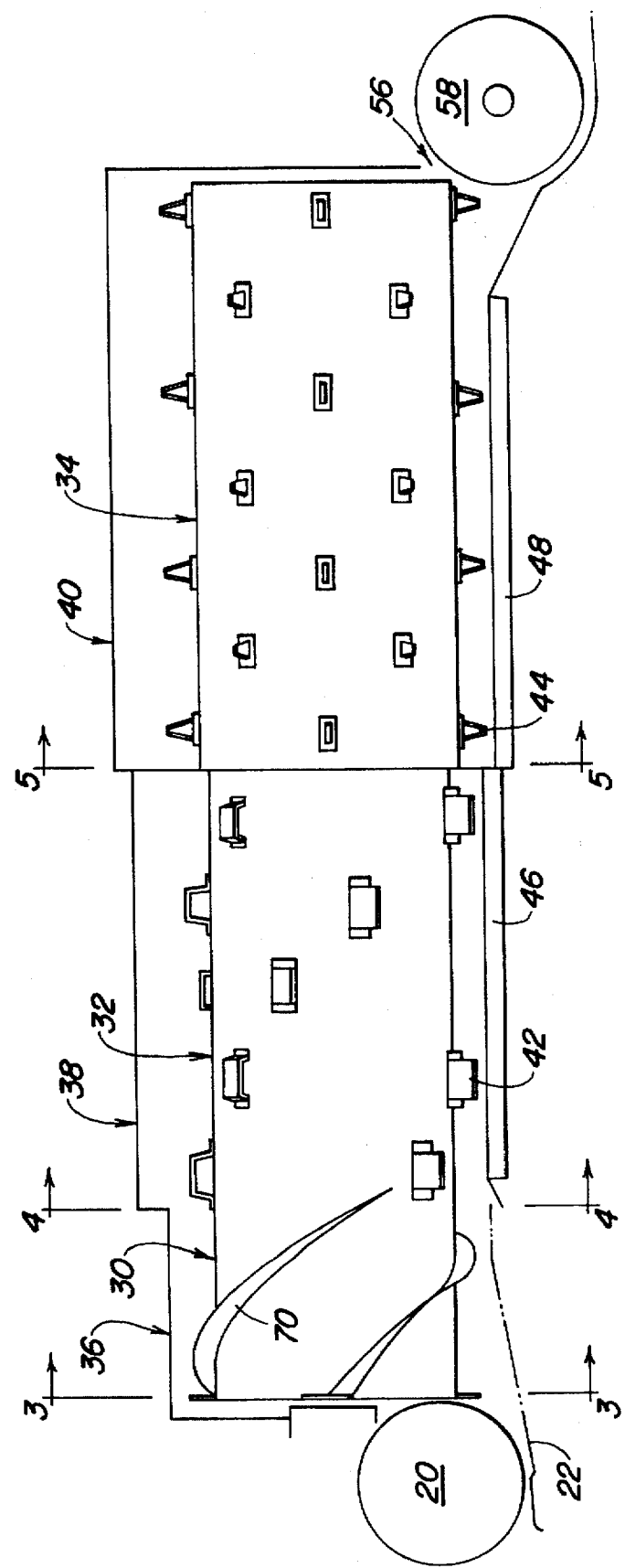
FIG. 2 is a cross sectional side view of the axial crop processing unit.

FIG. 1 shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between the sidesheets of the combine. The sidesheets form part of the supporting structure.

The axial crop processing unit 24 comprises an axial rotor housing 26 and an axial rotor 28 located in the housing. The harvested crop enters the housing through the inlet transition section 22. The rotor is provided with an infeed portion 30, a threshing portion 32 and a separating portion 34. The rotor housing has a corresponding infeed section 36, a threshing section 38 and a separating section 40.

Both crop processing portions, the threshing portion 32 and the separating portion 34, are provided with crop engaging assemblies 42 and 44, respectively. The threshing section 38 of the rotor housing is provided with a concave 46 and the separating section is provided with a grate 48. Grain and chaff released from the crop mat falls through the concave 46 and the grate 48. The concave and grate prevent the passage of crop material larger than grain or chaff from entering the cleaning system 50.

As illustrated in FIG. 1, grain and chaff falling through the concave 46 and grate 48 is directed to cleaning system 50 which removes the chaff from the grain. The clean grain is then directed by an elevator conveyor (not shown) to clean grain tank 52 where it can be directed to a truck or grain cart by unloading auger 54. As the straw reaches the end of the crop processing unit it is expelled through an outlet 56 to a beater 58. The beater propels the straw out the rear of the combine. The operation of the combine is controlled from operator's cab 60.

The rotor is axially arranged in the combine and defines a central rotor axis RA. The rotor axis RA is a straight line passing through the infeed, threshing and separating portions of the rotor.

Figure 3:
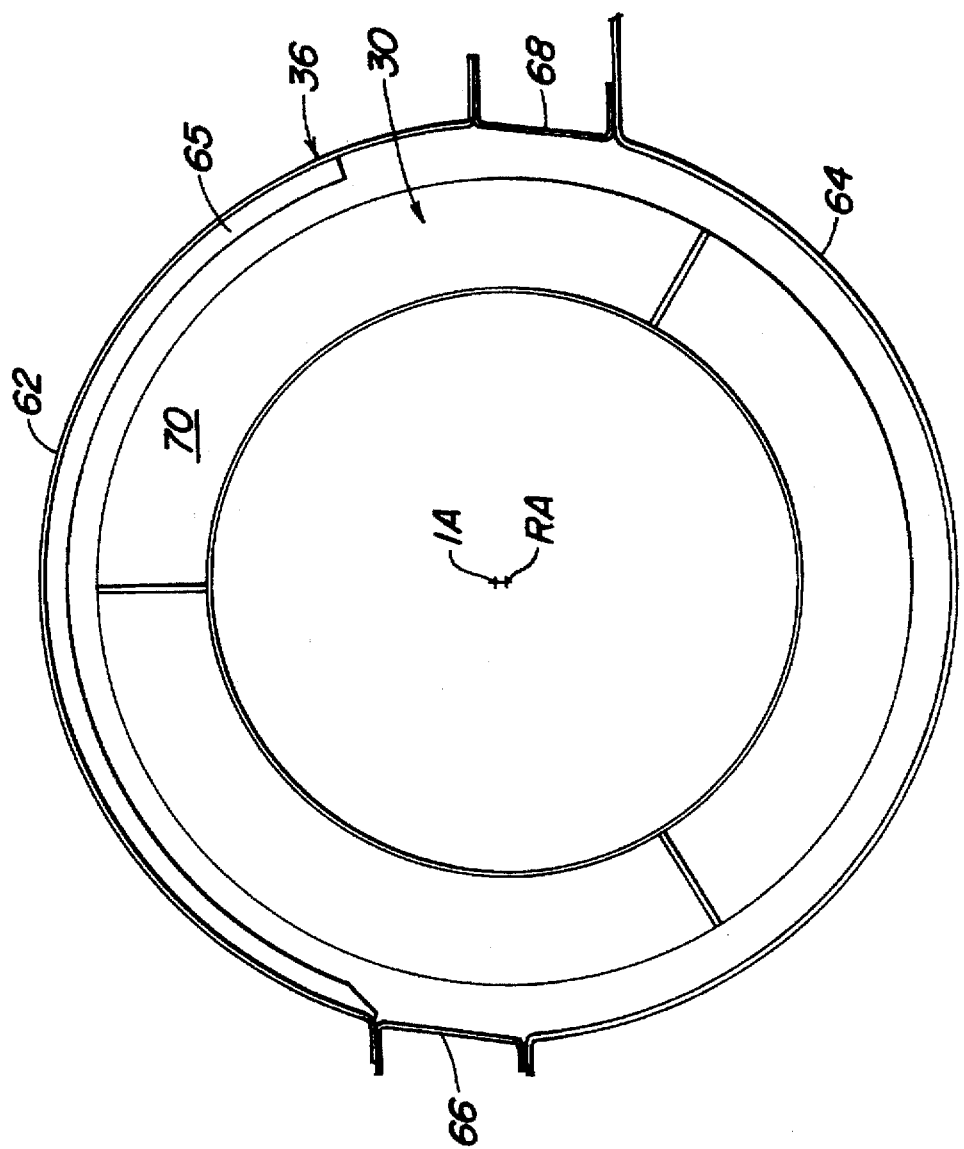
FIG. 3 is a cross sectional transverse view of the infeed section taken along line 3—3 of FIG. 2.

As seen in FIG. 3, the infeed section 36 of the rotor housing 26 is provided with a closed cover 62 and a closed bottom 64. The cover 62 is provided with helical indexing vanes 65. The cover and bottom are bolted to axial rails 66 and 68. Cover 62 is provided with helical vanes 70. The forward portion of the closed bottom 64 is provided with an inlet transition section 22 which is substantially identical to the one disclosed in U.S. Pat. No. 5,344,367.

The closed cover 62 of the infeed section 36 defines an infeed axis IA. The infeed axis IA is parallel to and substantially collinear with the rotor axis RA defined by the rotor. As such, the infeed portion 30 of the rotor is substantially concentrically arranged in the infeed section 36 of the rotor housing as defined by the cover 62.

Figure 4:
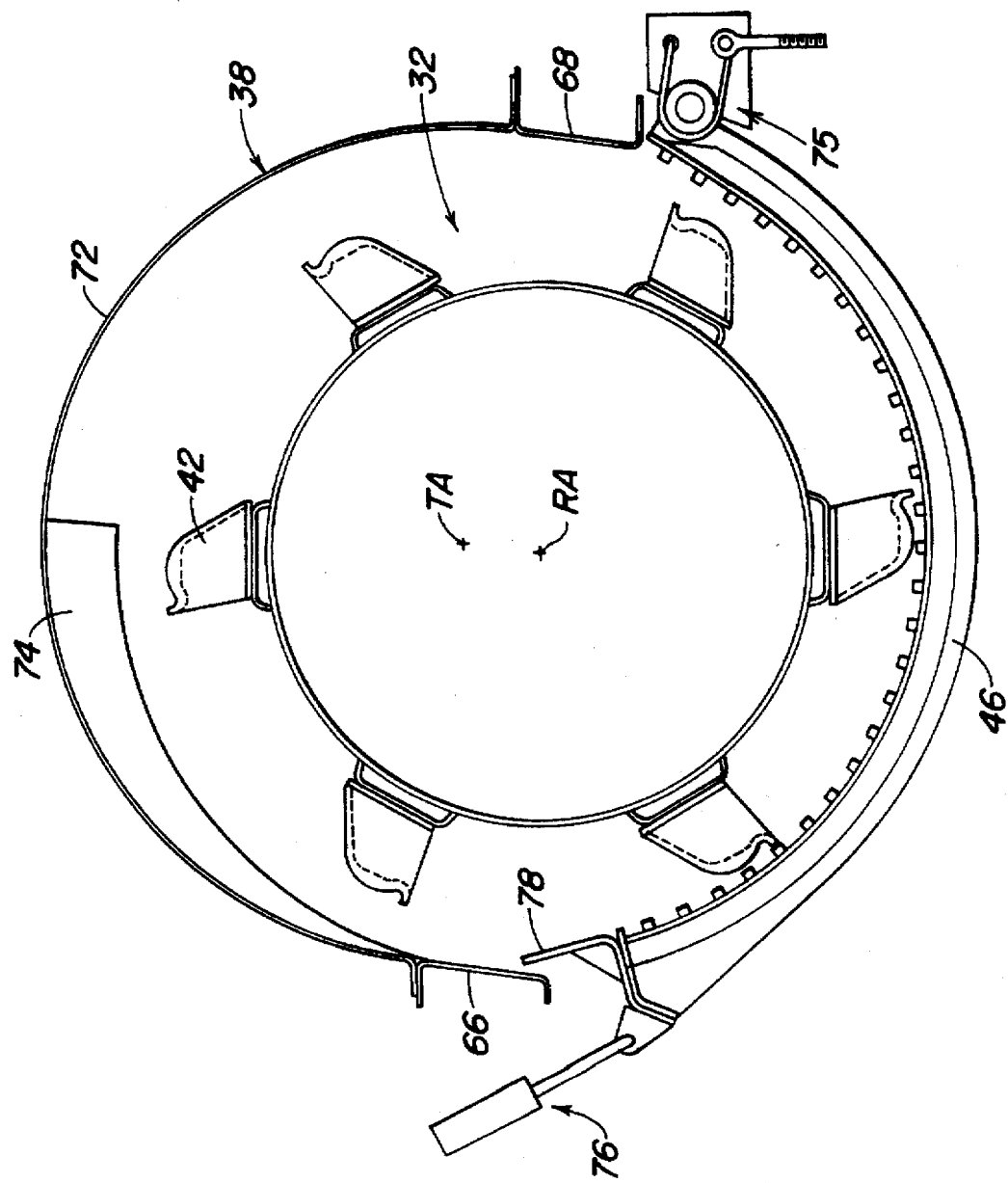
FIG. 4 is a cross sectional transverse view of the threshing section taken along line 4—4 of FIG. 2.

As seen in FIG. 4, the threshing section 38 is provided with a closed threshing cover 72 having helical vanes 74. The cover is bolted to axial rails 66 and 68. The concave 46 is pivotally mounted to the frame of the combine below rail 68 at 75. An adjustment assembly 76 for adjusting concave clearance is mounted to the frame of the combine below rail 66. The concave 46 is provided with a closed extension 78.

The threshing cover 72 defines a threshing axis TA that is parallel to the rotor axis RA. The threshing axis is located above the rotor axis RA. In addition, the threshing axis is slightly offset to the side of the rotor axis in a downstream direction. More specifically, the rotor rotates in a clockwise direction and the threshing axis is to the right of the 12:00 O'Clock position as dictated by the rotor axis RA. As such, the cover of the threshing section is eccentrically arranged relative to the threshing portion of the rotor.

The separating section 40 is provided with a separating cover 80 having helical vanes 82. The cover is bolted to axial rails 66 and 68. Grate 48 is also bolted to rails 66 and 68. Grate 48 is similar to the grate disclosed in U.S. Pat. No. 4,875,891.

The separating cover 80 defines a separating axis SA that is parallel to the rotor axis RA. The separating axis is located above the rotor axis RA. In addition, the separating axis is offset to the side of the rotor axis in a downstream direction. More specifically, the rotor rotates in a clockwise direction and the separating axis is to the right of the 12:00 O'Clock position as dictated by the rotor axis RA. As such, the cover of the separating section is eccentrically arranged relative to the separating portion of the rotor.

The separating axis SA is further removed from the rotor axis RA than the threshing axis TA, making the separating section more eccentric.

The present invention should not be limited by the above-described embodiment, but should be limited solely by the claims that follow.

We claim:

1. A combine for harvesting, threshing and separating crop material comprising:

a supporting structure;

ground engaging means extending from the supporting structure for transporting the supporting structure around a field;

an axial rotor housing located inside the supporting structure, the rotor housing is provided with an infeed section for introducing crop into the housing, a threshing section for threshing harvested crop material and a separating section for separating threshed grain from threshed crop material, the infeed section defining an infeed axis, the threshing section defining a threshing axis and the separating section defining a separating axis;

an axial rotor located in the rotor housing having an axial rotor axis, the rotor is provided with crop engaging assemblies for engaging crop material passing through the rotor housing, the rotor has an infeed portion corresponding to the infeed section of the rotor housing, a threshing portion corresponding to the threshing section of the rotor housing and a separating portion corresponding to the separating section of the rotor housing, whereby the infeed section of the rotor housing is arranged so that the infeed axis is substantially parallel to and in-line with the rotor axis, the threshing axis is parallel to and offset above the rotor axis and the separating section of the rotor housing is arranged so that the separating axis is parallel to and offset above the rotor axis, the threshing axis is less offset from the rotor axis than the separating axis.

2. A combine as defined by claim 1 wherein the infeed axis, the threshing axis and the separating axis are defined by the covers of the infeed, threshing and separating sections respectively.

3. A combine as defined by claim 2 wherein threshing axis and the separating axis are offset downstream from the rotor axis.

4. A combine for harvesting, threshing and separating crop material comprising:

a supporting structure;

ground engaging means extending from the supporting structure for transporting the supporting structure around a field;

a rotor housing located inside the supporting structure, the rotor housing is provided with an infeed section for introducing crop material into the housing, a threshing section for threshing harvested crop material, and a separating section for separating threshed grain from threshed crop material, the infeed section defining an infeed axis, the threshing section defining a threshing axis and the separating section defining a separating axis;

a rotor located in the rotor housing having a rotor axis, the rotor is provided with crop engaging assemblies for engaging crop material passing through the rotor housing, the rotor having an infeed portion, a threshing portion and a separating portion corresponding to the infeed, threshing and separating sections of the housing, whereby the infeed section of the rotor housing is arranged so that the infeed axis is substantially collinear with the rotor axis and the threshing and separating sections of the rotor housing are arranged so that the threshing axis and the separating axis are located parallel to and above the rotor axis.

5. In a combine having a mobile supporting structure adapted to advance over a field and a forward harvesting means adapted to remove crop material from the field and deliver it rearwardly to an improved threshing and separating mechanism comprising:

an elongated rotor mounted in the supporting structure for rotation about a generally fore and aft axis and having a forward infeed portion, a threshing portion, and a rearward separating portion, each portion being provided with crop engaging elements; and a generally tubular housing mounted in the supporting structure and surrounding the rotor, the crop material being delivered from the harvesting means into the annular space between the rotor and the housing and moving rearwardly in an axial spiral, the housing including a generally cylindrical infeed section coaxial with the rotor, a threshing section having a generally semi-cylindrical concave that is generally coaxial with the rotor axis and a generally semi-cylindrical cover having a center of curvature that is offset from the rotor axis so that the space between the rotor and the second portion of the housing separating section is greater than the space between the rotor and the first portion of the housing, and a separating section having a generally semi-cylindrical grate that is generally coaxial with the rotor axis and the generally semi-cylindrical cover having a center of curvature that is offset from the rotor axis to a greater degree than the threshing section.

6. The invention described in claim 5 wherein the threshing cover and the separating cover includes helical vanes that extend into the space between the rotor and covers to engage crop material in said space and direct it in a rearward spiral.

7. In a combine having a mobile supporting structure adapted to advance over a field and a forward harvesting means adapted to remove crop material from the field and deliver it rearwardly to an improved threshing and separating mechanism comprising:

an elongated rotor mounted in the supporting structure for rotation about a generally fore and aft axis and having a forward infeed portion, a threshing portion and a rearward separating portion, each portion being provided with crop engaging elements; and a generally tubular housing mounted in the supporting structure and surrounding the rotor, the crop material being delivered from the harvesting means into the annular space between the rotor and the housing and moving rearwardly in an axial spiral, the housing including a forward generally cylindrical infeed section, generally coaxial with the rotor and including an inlet transition section, a threshing section having a semicircular concave and an upper arcuate cover, the cross sectional area of the space between the cover and the rotor periphery being substantially greater than the cross sectional area of the space between the concave and the rotor periphery, and a separating section having a generally semi-cylindrical grate and an upper arcuate cover, the cross sectional area of the space between the cover and the separating portion of the rotor periphery being substantially greater than the cross sectional area of the space between the threshing cover and the threshing portion of the rotor.

* * * * *